United States Patent
Hatayama

(10) Patent No.: US 8,640,164 B2
(45) Date of Patent: Jan. 28, 2014

(54) LOCAL INFORMATION BROADCAST SYSTEM, AND BROADCAST DEVICE AND BROADCAST METHOD THEREOF

(75) Inventor: Akihiro Hatayama, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 869 days.

(21) Appl. No.: 11/806,112

(22) Filed: May 30, 2007

(65) Prior Publication Data

US 2007/0283386 A1 Dec. 6, 2007

(30) Foreign Application Priority Data

May 31, 2006 (JP) ................................ 2006-152779

(51) Int. Cl.
*H04N 7/10* (2006.01)
*H04N 7/025* (2006.01)

(52) U.S. Cl.
USPC ............................................................. 725/35

(58) Field of Classification Search
None
See application file for complete search history.

(56) References Cited

U.S. PATENT DOCUMENTS

| | | | | |
|---|---|---|---|---|
| 5,689,648 | A * | 11/1997 | Diaz et al. ........................ | 705/26 |
| 7,573,531 | B1 * | 8/2009 | Aggarwal et al. .............. | 348/553 |
| 7,584,493 | B2 * | 9/2009 | Sibley et al. ..................... | 725/68 |
| 2002/0184642 | A1 * | 12/2002 | Lude et al. ..................... | 725/105 |
| 2003/0041336 | A1 * | 2/2003 | Del Sordo et al. ............ | 725/140 |
| 2003/0093530 | A1 | 5/2003 | Syed | |
| 2003/0200548 | A1 * | 10/2003 | Baran et al. ..................... | 725/90 |
| 2004/0064836 | A1 * | 4/2004 | Ludvig et al. ................... | 725/95 |
| 2004/0111743 | A1 * | 6/2004 | Moncreiff ......................... | 725/35 |
| 2006/0085834 | A1 * | 4/2006 | Chang et al. .................. | 725/115 |
| 2007/0061862 | A1 * | 3/2007 | Berger et al. ................. | 725/139 |

FOREIGN PATENT DOCUMENTS

| | | | |
|---|---|---|---|
| JP | 6-104806 | 4/1994 | |
| JP | 6-209301 | 7/1994 | |
| JP | 2000-244383 | * 9/2000 | ............... H04B 7/15 |
| JP | 2001-331138 | 11/2001 | |
| JP | 2003-110512 | 4/2003 | |
| JP | 2003-234712 | 8/2003 | |
| JP | 2004-32160 | 1/2004 | |
| JP | 2004-135171 | 4/2004 | |
| JP | 2005-92483 | 4/2005 | |
| JP | 2005-203911 | 7/2005 | |
| JP | 2006-217004 | 8/2006 | |

OTHER PUBLICATIONS

Official Action issued by the Canadian Intellectual Property Office on Mar. 8, 2010, for Canadian Patent Application No. 2,590,120.

(Continued)

*Primary Examiner* — Brian Pendleton
*Assistant Examiner* — Ryan Stronczer
(74) *Attorney, Agent, or Firm* — Finnegan, Henderson, Farabow, Garrett & Dunner, LLP

(57) ABSTRACT

In a local information broadcast system according to the present invention, a content distribution center distributes broadcast contents of local information to broadcast devices arranged in a service area via a master station. Each of the broadcast devices receives the distributed contents by a communication unit, stores the contents in a storage unit and cyclically outputs the stored contents by an output unit, converts the contents into broadcast signals in a transmission system of a digital broadcast and broadcasts the broadcast signals to the service area by a transmission unit, and provides a receiving terminal capable of receiving digital broadcast in the service area of the local information.

9 Claims, 2 Drawing Sheets

(56) References Cited

OTHER PUBLICATIONS

Ichioka et al., UCIS: Urban Community Information System with Infrared Communication Technology, the Information Processing Society of Japan, Apr. 16, 1999, vol. No. 30, pp. 13-18.
Office Action for Application No. MX/a/2007/006361, the Mexican Patent Office, mailed Mar. 25, 2010.
Official Letter of Inquiry including Pre-Appeal Examination Report for Japanese Patent Application No. 2007-134569, the Japanese Patent Office, mailed Aug. 10, 2010.
Sony Published Technical Report 2006-0013, Jan. 10, 2006, vol. 15, No. 1.
Notice of Reasons for Rejection issued by the Japanese Patent Office on May 27, 2008, for Japanese Patent Application No. 2007-134569, and English-language translation thereof.
Ichioka et al., "Urban Community Information System Using Simple Infrared Broadcasting Telecommunication Protocol," Institusion of Electronics, Information and Communication Engineers, Technical Report (Jul. 1, 2001), J84-B:1299-1310.
Notice of Reasons for Rejection for Application No. 2007-134569, from the Japanese Patent Office, mailed Mar. 1, 2011.
Final Notice of Rejection for Application No. 2007-134569, from the Japanese Patent Office, mailed Nov. 15, 2011.
Notice of Reasons for Rejection for Application No. 2011-103167, from the Japanese Patent Office, mailed Feb. 21, 2012.

* cited by examiner

LOCAL INFORMATION BROADCAST SYSTEM, AND BROADCAST DEVICE AND BROADCAST METHOD THEREOF

CROSS-REFERENCE TO RELATED APPLICATIONS

This application is based upon and claims the benefit of priority from prior Japanese Patent Application No. 2006-152779, filed May 31, 2006, the entire contents of which are incorporated herein by reference.

BACKGROUND OF THE INVENTION

1. Field of the Invention

The present invention relates to a local information broadcast system to easily broadcast local broadcast content to an arbitrary area, a broadcast device and a broadcast method appropriate to be used for the system.

2. Description of the Related Art

A service has been proposed, in which the service broadcasts local broadcast content to an arbitrary area, for example, it broadcasts videos and images to introduce events and special goods for an area, such as an event place and a shopping district, by means of an existing broadcast infrastructure. Giving an example, JP-A 2000-244383 (KOKAI) has disclosed a technology to provide local broadcast materials by using a retransmitting device to retransmit a satellite broadcast signal to a dead zone without newly constructing a transmitting/receiving device in a satellite broadcast system for mobile object in use of code division multiplexing (CDM). The provided method places the retransmitting device to retransmit the satellite broadcast signal at arbitrary area, transmits the local broadcast content to the retransmitting device, and multiplexes the broadcast content on the satellite broadcast signal in a CDM system to broadcast them. However, the method requires the retransmitting device to have a function for multiplexing broadcast content on the satellite broadcast signal in the CDM system. The method broadcasts the broadcast content with the retransmission of the satellite broadcast signal in view, then, the method is not appropriate to broadcast only the local broadcast content.

BRIEF SUMMARY OF THE INVENTION

An object of the present invention is to provide a local information broadcast system capable of easily broadcasting local information to an arbitrary area, and to provide a broadcast device and a broadcast method thereof.

A local information broadcast system regarding the invention comprises: a content distribution center which distributes broadcast content by arbitrary local information; a master station which transmits the broadcast content distributed from the content distribution center to an arbitrary service area; a broadcast device which is disposed in the arbitrary service area to be connected to the master station via a communication path, and converts the broadcast content distributed from the content distribution center into a broadcast signal in a transmission system of a digital broadcast operated in the service area to broadcast it into the service area; and a receiving terminal which receives the broadcast signal to be transmitted from the broadcast device when the receiving terminal enters the service area, wherein the broadcast device comprises a communication unit which receives the broadcast content distributed from the content distribution center; an storage unit which stores the broadcast content received by the communication unit; an output unit which cyclically outputs the broadcast content stored in the storage unit; and a transmitting unit which converts the cyclically output broadcast content into a broadcast signal with a pre-assigned frequency in the transmission system of the digital broadcast to transmit it.

A local information broadcast device, regarding the invention, which is disposed in a service area in which broadcast content by arbitrary local information is broadcast comprises: a communication unit which receives the broadcast content by the local information transmitted via a communication path; an storage unit which stores broadcast content received by the communication unit; an output unit which cyclically outputs the broadcast content stored in the storage unit; and a transmitting unit which converts the cyclically output broadcast content into a broadcast signal in a transmission system of a digital broadcast operated in the service area to transmit it.

A local information broadcast method, regarding the invention, which is disposed in a service area in which broadcast content by arbitrary local information is broadcast comprises: receiving the broadcast content by the local information transmitted via a communication path; storing the received broadcast content; cyclically outputting the stored broadcast content; and converting the cyclically output broadcast content into a broadcast signal in a transmission system of a digital broadcast operated in the service area to transmit it.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, embodiments of the invention will be described in detail with reference to the drawings.

Figure 1:
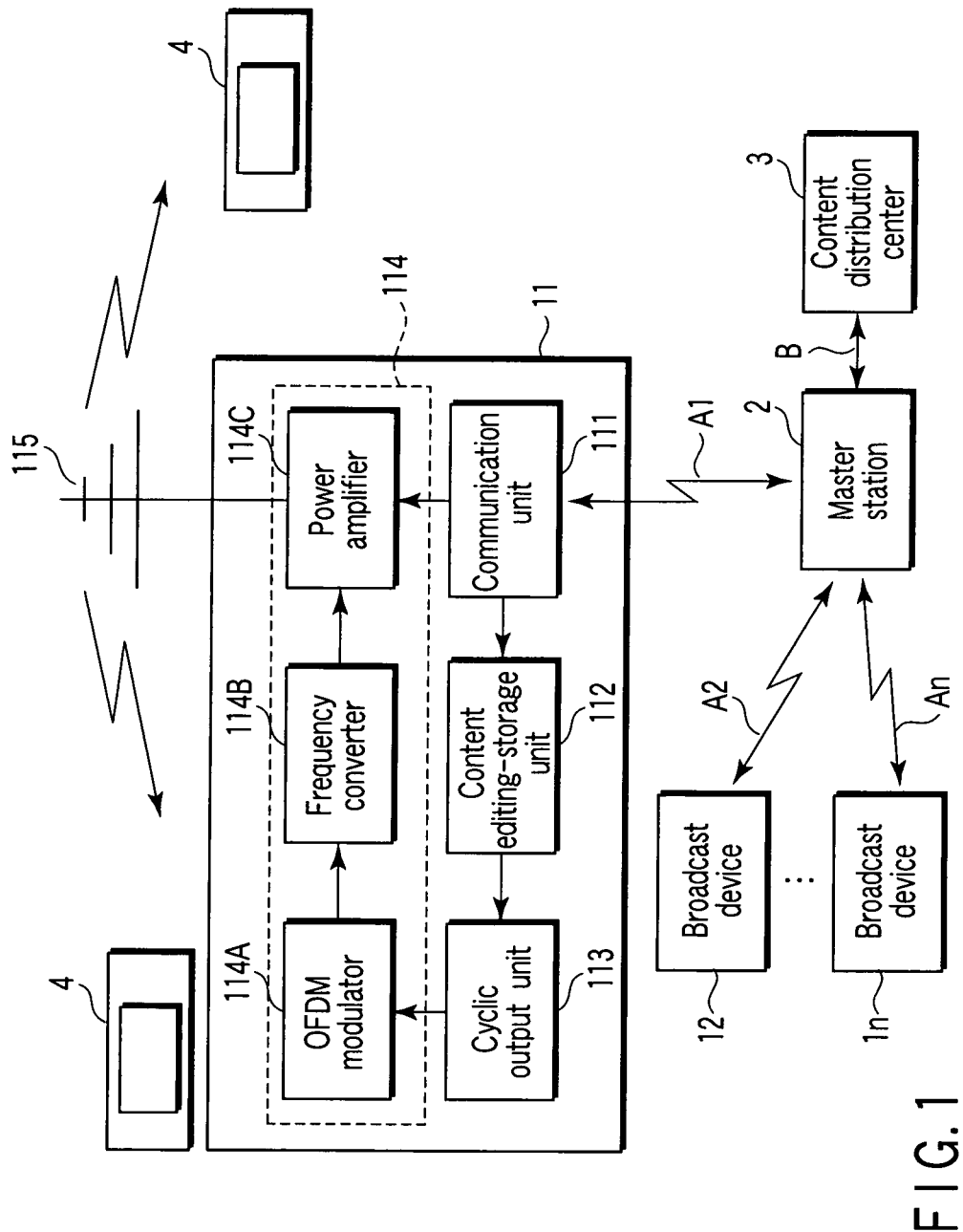
FIG. 1 is an exemplary block diagram showing a configuration of a local information broadcast system with a broadcast device regarding the invention.

FIG. 1 is a block diagram illustrating a configuration of a local information broadcast system with a broadcast device regarding the invention.

Broadcast devices 11-1n (n is arbitrary natural number), in FIG. 1, are provided in one or more service areas, such as underground malls and shopping centers in huge buildings to which a local broadcast is offered, and broadcasts the given broadcast content to the service areas in a digital broadcast system to be operated in the service areas with the broadcast devices 11-1n provided therein. The broadcast devices 11-1n provided in each service area are connected to a master station 2 via communication paths A1-An, respectively.

The master station 2 is connected to a content distribution center 3 via a communication path B to control communication among the broadcast devices 11-1n and the content distribution center 3, and for instance, a transmitting device, such as a radio base station and a carrier terminal station device, corresponds to the master station 2.

The content distribution center 3 corresponds to a studio in a broadcast station, and distributes control information to control processing, such as editing and transmitting in and from the broadcast devices 11-1n. The content distribution center 3 receives the broadcast monitor information transmitted from the broadcast devices 11-1n via the master station 2.

The broadcast devices 11-1n are the same in configuration. Hereinafter, the configuration of the broadcast device 11 will be described in behalf of those of the broadcast devices 11-1n.

The broadcast device 11 has a communication unit 111 which functions as a slave station of a radio communication or a network interface device of a cable system. The communication unit 111 makes a data communication to and from the master station 2 to receive broadcast content and control information distributed from the content distribution center 3. Based on the control information, the communication unit 111 generates, for instance, editing control information to a content editing-storage unit 112, and generates transmission on/off control information to the below mentioned power amplifier 114C. The broadcast content received by the communication unit 111 are transmitted to the content editing-storage unit 112 together with the editing control information.

The content editing-storage unit 112 edits the broadcast content to prescribed local broadcast programs to sequentially accumulate them on the basis of the editing control information. The broadcast content stored in the content editing-storage unit 112 is read cyclically by a cyclic output unit 113 to be transmitted to a transmitting device 114.

The transmitting device 114 uses a device to be used for a broadcast operated in an area in which the broadcast device 11 is placed, for example, a device for a terrestrial digital broadcast that is resistant to multipath reflection and interference. Hereinafter, the present embodiment will be set forth in description by taking the case of the use of a transmitting device for the terrestrial digital broadcast as an example.

The transmitting device 114 assigns input content to a prescribed carrier through an orthogonal frequency division multiplex (OFDM) modulator 114A to apply OFDM modulation thereto, and converts the OFDM-modulated signal obtained in such modulation into a broadcast frequency pre-assigned by a frequency converter 114B. When the transmitted on/off control information from the communication unit 111 indicates transmission on, the power amplifier 114C power-amplifies the OFDM-modulated signal converted into the broadcast frequency, and transmits it as a terrestrial digital broadcast signal from, e.g., an antenna 115 through a weak radio signal the coverage area of which is around 100 meters. The signal may be received and demodulated by a receiver for the terrestrial digital broadcast or a receiving terminal 4 of a cellular phone terminal, etc., corresponding to the terrestrial digital broadcast.

The broadcast device 11 equipped with the transmitting device 114 for the terrestrial digital broadcast is, as mentioned above, provided in a service area, in which a terrestrial digital broadcast signal is hardly received, such as a shopping mall, a building of a huge store, and an underground shopping district. The broadcast device 11 is presumed as a mini broadcast station covering the service area. When the receiving terminal 4 enters the service area to which the terrestrial broadcast signal which has been received by the receiving terminal 4 cannot arrive, the receiving terminal 4 receives a digital broadcast signal with new content in the service area instead of the terrestrial digital broadcast signal which has been received thereby.

Figure 2:
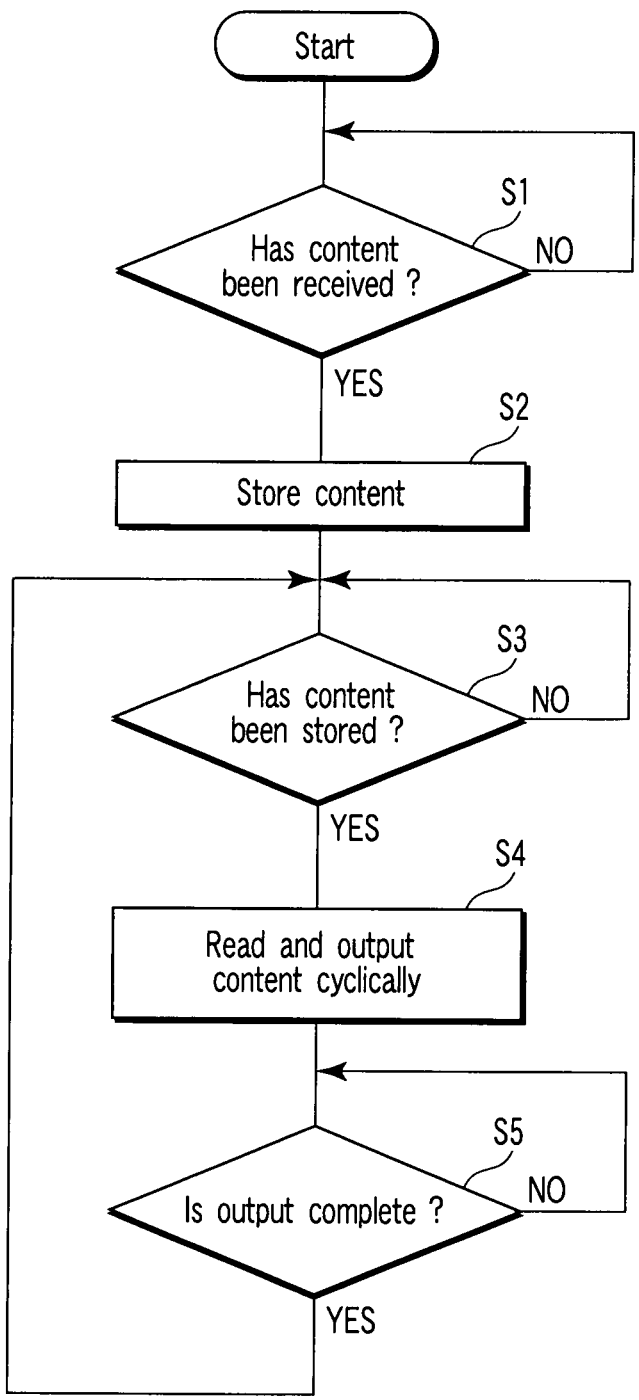
FIG. 2 is an exemplary flowchart showing a processing procedure of the broadcast device.

FIG. 2 illustrates a processing procedure of the broadcast device 11. In FIG. 2, the communication unit 111 firstly monitors a receiving situation of the broadcast content passing through the communication path A1 (step S1), and if the broadcast content is received, the broadcast device 11 transmits and stores the received broadcast content to and in the content editing-storage unit 112 (step S2).

The cyclic output unit 113 monitors a content accumulation situation in the content editing-storage unit 112 (step S3), and when the broadcast content is stored, the cyclic output unit 113 reads them cyclically, and the transmitting device 114 converts them into the terrestrial digital broadcast signal to transmit it (step S4).

The communication unit 111 monitors a content output situation in the step S4 (step S5), and when the output is completed, the broadcast device 11 returns to monitor the content storage situation in the step S3 to continue the processing procedure.

It is not necessary for the digital broadcast signal transmitted from the broadcast device 11 to be limited and operated to a channel frequency of one broadcast station of the terrestrial digital broadcast operated in an area with the broadcast device 11 provided therein. When a plurality of stations are operated, if the digital broadcast signals are operated in some channel frequencies corresponding to the stations, it becomes possible to view the broadcast content by receiving in any channel, and a user may simplify a tuning operation.

The broadcast content to be transmitted cyclically may be stored as, for example, one program in the content editing-storage unit 112, and the communication unit 111 may be overwritten and updated sequentially by means of the broadcast content newly received through the communication path A1. As for another method, the content editing-storage unit 112 may store and manage the broadcast content by a plurality of program units, and the cyclic output unit 113 may select to cyclically transmit the program specified by the control information from the content distribution center 3 among the plurality of programs stored in the content editing-storage unit 112.

The broadcast device with the configuration given above receives the distribution of the broadcast content through the communication paths A1-An to automatically accumulate the broadcast content, and cyclically outputs the stored broadcast content to broadcast it in a form of the terrestrial digital broadcast. Therefore, the receiving terminal 4, corresponding to the reception of the terrestrial digital broadcast which has started to prevail recently, becomes possible to view the broadcast content.

Accordingly, the broadcast device 11 may easily broadcast the local broadcast content in a service area only by disposing the broadcast device 11 at an arbitrary place in the service area in which the communication paths A1-An can be laid.

It is presumed that a signal format and a modulation system of the terrestrial digital broadcast follows specifications employed in the country, region, etc., in which the broadcast device is provided. For a digital broadcast, for example, a system using only one segment of the OFDM, a Digital Multimedia Broadcast (DMB) system, or the like are available; however, it is preferable for a digital broadcast system to be resistant to multipath reflection, interference, etc., generated in the service area in a building or the like.

On the contrary, if the terrestrial digital broadcast is not operated, the broadcast device being deteriorated in interference-resistant performance, the broadcast system with an existing AM or FM broadcast signal becomes an application object for this invention. If the receiving terminal 4 is the cellular phone terminal, it is a matter of course that the receiving terminal 4 corresponds to the existing broadcast signal, and it is easily analogized, so that the detail thereof will be omitted.

In the aforementioned configuration, if the communication unit 111 transmits information on stored content in the content editing-storage unit 112 to the content distribution center 3 through the master station 2 and receives an instruction concerning to unnecessary content from the content distribution center 3, the communication unit 111 makes the content editing-storage unit 112 delete the content instructed therefrom. Thereby, the broadcast device 11 may control the storage of the content from the content distribution center 3.

When receiving the control information to instruct switching on or off of the transmission from the content distribution center 3, the communication unit 111 selectively stops the output from the power amplifier 114C. Thereby, the content distribution center 3 may remotely stop the content broadcast from the broadcast device 11.

By the way, for the communication path A1, not only a cable transmission path using an optical fiber or a communication cable in use of a coaxial cable capable of making a broadband communication but also a subscriber system communication network in radio are available.

In a radio system, it is possible to achieve a distribution in a subscriber system by fixed wireless access (FWA), in a cellular phone line, in a subscriber system using the cellular phone line, or the like. However, with taking a communication fee, a device cost, the foregoing regular connectivity and traffic securement into account, a subscriber system communication network by worldwide interoperability for microwave access (WiMAX: IEEE 802.16a) which has started to prevail recently is excellent in total performance.

In other words, the WiMAX can perform a broadband radio communication in a wide range of a radius of several 10 kilometers, and it is not limited to a narrow space in a communication range with a short distance like a wireless LAN. Therefore, a setting plan of the master station 2 and the broadcast device 11 disposed near by the content distribution center 3 becomes easy. Providing the broadcast device 11 at an arbitrary position within the coverage area of the WiMAX makes it possible to distribute the content in the broadband from the master station 2 with omitting the aforementioned laying of the communication cable.

Using the WiMAX makes the setting position of the broadcast device free and also makes the constant connection thereof possible. Therefore, the broadcast device 11 may easily secure the traffic for the content distribution in the communication path A1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A local information broadcast system, comprising:
    a content distribution center which distributes broadcast content and distributes control information to control editing the broadcast content and transmitting a digital broadcast signal;
    a master station which receives the broadcast content and the control information from the content distribution center and transmits the broadcast content and the control information to an arbitrary local service area;
    a broadcast device which is disposed in the arbitrary local service area and is connected to the master station via a communication path, the broadcast device re-transmitting in the arbitrary local service area the broadcast content as local information by transmitting the digital broadcast signal based on the control information; and
    a cellular receiving terminal which receives the digital broadcast signal from the broadcast device when the cellular receiving terminal enters the arbitrary local service area,
    wherein the broadcast device comprises:
        a communication unit which receives the broadcast content and the control information from the master station, and generates editing control information to edit the broadcast content and transmission control information to transmit the digital broadcast signal;
        a storage unit which edits the broadcast content received by the communication unit based on the editing control information and stores the edited broadcast content;
        an output unit which cyclically reads and outputs the broadcast content stored in the storage unit; and
        a transmitting unit which converts the cyclically output broadcast content into the digital broadcast signal with a pre-assigned channel frequency and transmits the digital broadcast signal based on the transmission control information.

2. The system according to claim 1, wherein the cellular receiving terminal has a reception function to receive the local digital broadcast signal.

3. The system according to claim 1, wherein the communication path is any one of an optical fiber or a coaxial cable, a subscriber system communication network of a cable system of an exclusive line, a subscriber system communication network of a radio system by fixed wireless access or worldwide interoperability for microwave access, a cellular phone line, or a subscriber system communication network using the cellular phone line.

4. The system according to claim 1, wherein the digital broadcast signal is a terrestrial digital broadcast signal.

5. A broadcast device of a local information broadcast system, the system including a master station which receives from a content distribution center broadcast content and control information to control editing the broadcast content and transmitting a digital broadcast signal, and transmits the broadcast content and the control information to an arbitrary local service area, the device comprising:
    a communication unit, disposed in the arbitrary local service area, which receives the broadcast content and the control information from the master station via a communication path, and generates editing control information to edit the broadcast content and transmission control information to transmit the digital broadcast signal;
    a storage unit which edits the broadcast content received by the communication unit based on the editing control information and stores the edited broadcast content;
    an output unit which cyclically reads and outputs the broadcast content stored in the storage unit; and
    a transmitting unit which converts the cyclically output broadcast content into the digital broadcast signal with a pre-assigned channel frequency and transmits the digital broadcast signal based on the transmission control information.

6. The device according to claim 5, wherein
the communication path is any one of an optical fiber or a coaxial cable, a subscriber system communication network of a cable system of an exclusive line, a subscriber system communication network of a radio system by fixed wireless access or worldwide interoperability for microwave access, a cellular phone line, or a subscriber system communication network using the cellular phone line.

7. The device according to claim 5, wherein
the digital broadcast signal is a terrestrial digital broadcast signal.

8. A method for use by a broadcast device of a local information broadcast system, the system including a master station which receives from a content distribution center broadcast content and control information to control editing the broadcast content and transmitting a digital broadcast signal, and transmits the broadcast content and the control information to an arbitrary local service area, the method comprising:

receiving the broadcast content and the control information from the master station, and generating editing control information to edit the broadcast content and transmission control information to transmit the digital broadcast signal;

editing the broadcast content based on the editing control information and storing the edited broadcast content;

cyclically reading and outputting the stored broadcast content; and converting the cyclically output broadcast content into the digital broadcast signal with a pre-assigned channel frequency and transmitting the digital broadcast signal based on the transmission control information.

9. The method according to claim 8, wherein
the digital broadcast signal is a terrestrial digital broadcast signal.

\* \* \* \* \*

UNITED STATES PATENT AND TRADEMARK OFFICE
CERTIFICATE OF CORRECTION

| | |
|---|---|
| PATENT NO. | : 8,640,164 B2 |
| APPLICATION NO. | : 11/806112 |
| DATED | : January 28, 2014 |
| INVENTOR(S) | : Hatayama |

It is certified that error appears in the above-identified patent and that said Letters Patent is hereby corrected as shown below:

Title Page, Item (30), in the "Foreign Application Priority Data," insert the following missing information:

--May 21, 2007   (JP) . . . . . . . . . . . . . 2007-134569--.

In the Claims:

Claim 2, column 6, line 32, change "receive the local digital" to --receive the digital--.

Signed and Sealed this
Twentieth Day of May, 2014

Michelle K. Lee
*Deputy Director of the United States Patent and Trademark Office*